(12) United States Patent
Brevig

(10) Patent No.: US 7,874,094 B2
(45) Date of Patent: Jan. 25, 2011

(54) FISHING LURE SPIRAL SPINNER APPLICATION

(76) Inventor: Thomas W. Brevig, 305 Greenleaf Ct., Allen, TX (US) 75002

( * ) Notice: Subject to any disclaimer, the term of this patent is extended or adjusted under 35 U.S.C. 154(b) by 0 days.

(21) Appl. No.: 12/359,316

(22) Filed: Jan. 24, 2009

(65) Prior Publication Data
US 2009/0193706 A1 Aug. 6, 2009

Related U.S. Application Data

(60) Provisional application No. 61/062,042, filed on Jan. 24, 2008.

(51) Int. Cl.
A01K 85/12 (2006.01)
(52) U.S. Cl. .............. 43/42.2; 43/42.11; 43/42.12; 43/42.16; 43/42.19; 43/42.46
(58) Field of Classification Search ............. 43/42.11, 43/42.12, 42.13, 42.14, 42.16, 42.19, 42.2, 43/42.21, 42.46, 42.51
See application file for complete search history.

(56) References Cited

U.S. PATENT DOCUMENTS

| | | | | |
|---|---|---|---|---|
| 261,194 | A | * | 7/1882 | Wylly ................ 43/42.51 |
| 295,350 | A | * | 3/1884 | Chapman ............ 43/42.2 |
| 323,111 | A | * | 7/1885 | Chapman ............ 43/42.12 |
| 661,788 | A | * | 11/1900 | Brooke .............. 43/42.16 |
| 667,257 | A | * | 2/1901 | Shakespeare et al. ... 43/42.14 |
| 755,612 | A | * | 3/1904 | Burdett .............. 43/42.2 |
| 777,488 | A | * | 12/1904 | Rhodes .............. 43/42.14 |
| 784,398 | A | * | 3/1905 | Heckeler ............. 43/42.2 |
| 804,206 | A | * | 11/1905 | Bruton .............. 43/42.51 |
| 830,404 | A | * | 9/1906 | Barnes .............. 43/42.21 |
| 1,002,785 | A | * | 9/1911 | Telford .............. 43/42.2 |
| RE13,499 | E | * | 12/1912 | Breder et al. ........ 43/42.14 |
| 1,140,279 | A | * | 5/1915 | Myers ............... 43/42.14 |
| 1,155,883 | A | * | 10/1915 | Burkman ............ 43/42.16 |
| 1,288,118 | A | * | 12/1918 | Morian .............. 43/42.16 |
| 1,495,927 | A | * | 5/1924 | Roland .............. 43/42.21 |
| 1,530,343 | A | * | 3/1925 | Bayer ............... 43/42.2 |
| 1,617,318 | A | * | 2/1927 | Brown ............... 43/42.2 |
| 1,694,195 | A | * | 12/1928 | Watts ............... 43/42.16 |
| 1,842,127 | A | * | 1/1932 | Stickel et al. ........ 43/42.14 |
| 1,870,767 | A | * | 8/1932 | Brown ............... 43/42.17 |
| 1,900,339 | A | * | 3/1933 | Harrell .............. 43/42.46 |

(Continued)

FOREIGN PATENT DOCUMENTS

DE          10015572 A1 *  10/2001

(Continued)

Primary Examiner—Darren W Ark

(57) ABSTRACT

A fishing lure and spinner blade designed in a helical form that rotates in a free form fashion or in an inline application. The "Tornado or Funnel" appearance of the blade as it spins through the water can be regulated by the speed of the retrieval, size of the blades and number of rotations on the spinner blade, which give a consistent spinning experience at any retrieval speed and level. The blades are affixed through split rings and swivels on varying spinner bait wire forms and spin effortlessly at high very slow to high retrieval rates and upon natural free falling through the water. The inline technology uses the tornado design to employ a dependable and effortless spinning motion around the axis of the wire form, and a streamlined spinner that doesn't need to have the blades set by applying force to the lure before spinning commences.

4 Claims, 4 Drawing Sheets

U.S. PATENT DOCUMENTS

| | | | | |
|---|---|---|---|---|
| 1,931,932 A * | 10/1933 | Myers et al. | ................ | 43/42.16 |
| 1,989,850 A * | 2/1935 | Dorsey | ................ | 43/42.12 |
| 1,993,868 A * | 3/1935 | Thornberg | ................ | 43/42.12 |
| 2,079,335 A * | 5/1937 | Pflueger | ................ | 43/42.16 |
| 2,139,424 A * | 12/1938 | Simon | ................ | 43/42.51 |
| 2,214,668 A * | 9/1940 | Erickson | ................ | 43/42.17 |
| 2,244,378 A * | 6/1941 | Turner | ................ | 43/42.14 |
| 2,389,423 A * | 11/1945 | Evans | ................ | 43/42.13 |
| 2,397,968 A * | 4/1946 | Lind | ................ | 43/42.19 |
| 2,435,993 A * | 2/1948 | Zink | ................ | 43/42.16 |
| 2,472,639 A * | 6/1949 | Wickens | ................ | 43/42.14 |
| 2,493,431 A * | 1/1950 | Wold | ................ | 43/42.2 |
| 2,494,407 A * | 1/1950 | Rhodes | ................ | 43/42.16 |
| 2,497,807 A * | 2/1950 | Wood | ................ | 43/42.2 |
| 2,562,743 A * | 7/1951 | Schindler et al. | ................ | 43/42.5 |
| 2,569,057 A * | 9/1951 | Hinerman | ................ | 43/42.2 |
| 2,571,980 A * | 10/1951 | Weigandt | ................ | 43/42.16 |
| 2,592,445 A * | 4/1952 | McCarthy | ................ | 43/42.46 |
| 2,660,827 A * | 12/1953 | Pero et al. | ................ | 43/42.19 |
| 2,662,330 A * | 12/1953 | Ogburn | ................ | 43/42.46 |
| 2,665,516 A * | 1/1954 | Race | ................ | 43/42.2 |
| 2,714,778 A * | 8/1955 | Megerle | ................ | 43/42.2 |
| 2,722,079 A * | 11/1955 | Johnson | ................ | 43/42.14 |
| 2,763,953 A * | 9/1956 | Criddle | ................ | 43/42.16 |
| 2,769,268 A * | 11/1956 | Miller | ................ | 43/42.16 |
| 2,796,694 A * | 6/1957 | Turner | ................ | 43/42.12 |
| 2,835,999 A * | 5/1958 | Gillian | ................ | 43/42.16 |
| 2,911,751 A * | 11/1959 | Mason | ................ | 43/42.06 |
| 2,935,809 A * | 5/1960 | Pratt | ................ | 43/42.13 |
| 2,967,372 A * | 1/1961 | Pass et al. | ................ | 43/43.13 |
| 3,001,318 A * | 9/1961 | Miller | ................ | 43/42.13 |
| 3,012,358 A * | 12/1961 | Multanen | ................ | 43/42.46 |
| 3,031,792 A * | 5/1962 | Swenson | ................ | 43/42.2 |
| 3,054,209 A * | 9/1962 | Wiley, Jr. | ................ | 43/42.2 |
| 3,245,171 A * | 4/1966 | Henry | ................ | 43/42.2 |
| 3,296,733 A * | 1/1967 | McLean | ................ | 43/42.21 |
| 3,397,478 A * | 8/1968 | Lowes, Jr. | ................ | 43/42.14 |
| 3,494,063 A * | 2/1970 | Treaster | ................ | 43/42.14 |
| D218,966 S * | 10/1970 | Weimer | ................ | D22/129 |
| 3,766,682 A * | 10/1973 | Majdak | ................ | 43/42.14 |
| 3,885,340 A * | 5/1975 | Volenec | ................ | 43/42.16 |
| 4,037,346 A * | 7/1977 | Holst | ................ | 43/42.2 |
| 4,090,319 A * | 5/1978 | Wolfe | ................ | 43/42.19 |
| 4,099,343 A * | 7/1978 | Enz | ................ | 43/42.19 |
| 4,110,930 A * | 9/1978 | Daniels | ................ | 43/42.14 |
| 4,135,323 A * | 1/1979 | Esten | ................ | 43/42.16 |
| 4,139,964 A * | 2/1979 | Pelletier | ................ | 43/42.19 |
| 4,208,824 A * | 6/1980 | Maxwell | ................ | 43/42.19 |
| 4,257,183 A * | 3/1981 | Arms | ................ | 43/42.19 |
| 4,416,080 A * | 11/1983 | Morrissette | ................ | 43/42.2 |
| 4,616,440 A * | 10/1986 | Millroy | ................ | 43/42.12 |
| 4,617,753 A * | 10/1986 | Pauley et al. | ................ | 43/42.19 |
| 4,637,158 A * | 1/1987 | Reid | ................ | 43/42.19 |
| 4,860,486 A * | 8/1989 | Vanderplow | ................ | 43/42.19 |
| 4,881,341 A * | 11/1989 | Dickey et al. | ................ | 43/42.19 |
| 4,884,359 A * | 12/1989 | Wray | ................ | 43/42.19 |
| 4,888,909 A * | 12/1989 | Adams | ................ | 43/42.16 |
| 4,891,901 A * | 1/1990 | Baker, Jr. | ................ | 43/42.13 |
| 4,936,042 A * | 6/1990 | Causey | ................ | 43/42.16 |
| 4,998,371 A * | 3/1991 | Driesel | ................ | 43/42.16 |
| 5,024,019 A * | 6/1991 | Rust et al. | ................ | 43/42.13 |
| 5,201,859 A * | 4/1993 | Rosek | ................ | 43/42.19 |
| 5,245,781 A * | 9/1993 | Helmuth | ................ | 43/42.2 |
| 5,263,277 A * | 11/1993 | Kelly | ................ | 43/43.13 |
| 5,381,621 A * | 1/1995 | Fuller | ................ | 43/42.13 |
| 5,491,926 A * | 2/1996 | Mostovsky | ................ | 43/42.19 |
| 5,497,581 A * | 3/1996 | Williams | ................ | 43/42.46 |
| 6,018,901 A * | 2/2000 | DuBois | ................ | 43/42.2 |
| 6,108,961 A * | 8/2000 | Milawski et al. | ................ | 43/42.2 |
| 6,173,521 B1 * | 1/2001 | Rockhill, Jr. | ................ | 43/42.13 |
| 6,176,035 B1 * | 1/2001 | Somogyi | ................ | 43/42.2 |
| 6,243,982 B1 * | 6/2001 | Halterman, Jr. | ................ | 43/42.21 |
| 6,523,297 B1 * | 2/2003 | Hair et al. | ................ | 43/42.2 |
| 6,820,365 B1 * | 11/2004 | Donnelly | ................ | 43/42.12 |
| 7,360,335 B2 * | 4/2008 | Edwards | ................ | 43/42.13 |
| 7,562,489 B2 * | 7/2009 | Turner | ................ | 43/42.46 |
| 7,644,533 B2 * | 1/2010 | Hair et al. | ................ | 43/42.2 |
| 2004/0025405 A1 * | 2/2004 | Rivera Gomez | ................ | 43/42.12 |
| 2005/0166444 A1 * | 8/2005 | Taylor | ................ | 43/42.13 |

FOREIGN PATENT DOCUMENTS

| | | | | |
|---|---|---|---|---|
| FR | 2766056 A3 | * | 1/1999 | |
| FR | 2790362 A1 | * | 9/2000 | |
| FR | 2806875 A1 | * | 10/2001 | |
| JP | 10243759 A | * | 9/1998 | |

* cited by examiner

FISHING LURE SPIRAL SPINNER APPLICATION

CROSS REFERENCE

Provisional patent Filing Date Jan. 24, 2008/Application No. 61/062,042

STATEMENT OF FEDERALLY SPONSORED R&D

N/A

REFERENCE TO SEQUENCE LISTING

N/A

BACKGROUND OF THE INVENTION

The present invention relates to fishing lures and specifically spinner baits, inline spinner baits, and top water spinner baits utilizing a helical spinner blade technology incorporating a specific spinner application for all types of spinner sizes and utilized in all water depths for anglers to entice and catch fish. It is known in the prior art of spinner technology that the spinning object is put into motion by pulling the lure against the water mass and thus creating a spinning motion that attracts fish. This invention specifically addresses the new spiral "tornado" effect the newly designed helical spinner blade creates when being pulled through the water, or descending naturally into deeper waters when no pressure is applied. The metal or plastic based helical spinner blade free form and inline applications allow the spinner to move effortlessly through the water creating a funnel effect around or about the body of the lure and attracting fish. This invention provides the angler with an effective and alternate type of spinner blade other than the traditional curved, spoon-like spinner blades that have been offered for many years.

BRIEF SUMMARY OF THE INVENTION

This invention comprises of a new spinner application that is manufactured to varying specs, shapes and sizes to provide a true & free spinning spiraled motion similar to that of a funnel or tornado motion through the water at all depths. When the lure is pulled through the water, the tornado style helical spinner blade spins effortlessly through the water at varying speeds dependent on the retrieval speeds and dimensions of the helical spinner blades. The helical spinner blade is stamped or cut out in a helical spiral shape and used in a free form or inline application. The free form spinner bait application uses the new helical spinner blade connecting to a split ring-ball bearing swivel-split ring assembly, which is connected to a wire shaft that is bent in standard L, C, and U shaped configurations, or connected to a top water body. The shaped wire shafts are molded with a lead free head specified at various sizes and designs, and a contiguous hook connected to the wire shaft at the base of the head. The inline application uses the same helical spinner blade but bent at a 90 degree angle perpendicular to the inline plane and a two piece, center bored, threaded, male cap and female collar assembly is screwed together through the helical spinner blade eyelet hole. The helical spinner blade assembly is slid onto the wire shaft to spin around the shaft body and create a sensational spinning effect while being pulled or falling through the water. The skirts of the lures are hand tied and collared using different types of materials like feathers, ribbon material, silicone and rubber skirting material, textile, hair, and a variety of other materials. Different skirt materials and the new spinning motion the tornado type lure creates an exciting new way to attract and catch fish for all types of anglers and all types of fish.

DETAILED DESCRIPTION OF THE PREFERRED EMBODIMENT

Figure 1:
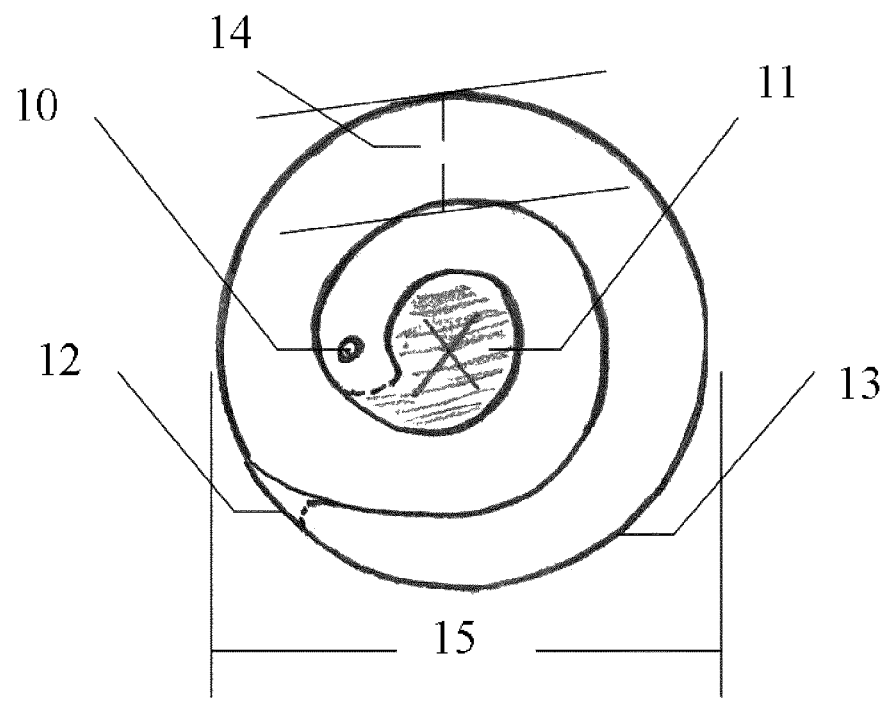
FIG. 1 shows an aerial view of the helical spinner blade design, the spiral pattern, the eyelet hole, the tail cut off section, and the middle section cut out area.

Referring to the drawings in FIG. 1, the helical spinner blade is designed to be punched out or cut out of a flat substrate (which can be embossed, textured, applied prismatic materials, or finished metal) such as stainless steel, aluminum, brass, copper, and steel alloy, or fabricated by using a steel alloy cast technique ranging in thickness of 0.010" to 0.375". Casting, laser cutting, or using a high powered hydraulic die stamping machine will punch out the cut off material for the eyelet in FIG. 1.10, the end of the tail FIG. 1.12, and the middle section of the helical spinner blade design in FIG. 1.11. The design is cut out around the lines in FIG. 1.13, and to the desired width for the helical spinner blade ranging from 0.040" to 8" as in FIG. 1.14 for each specific application ranging from trout and pan fish lures to shark and large oceanic species. FIG. 1.15 shows the relative diameter of the initial circle which is proportionally relative to the thickness of helical spinner blades and number of rotations within the spiral pattern. The higher the number of revolutions is inversely related to the helical spinner blade thickness in a set diameter, and thus is proportional to the rotational speed of the helical spinner blade.

Figure 2:
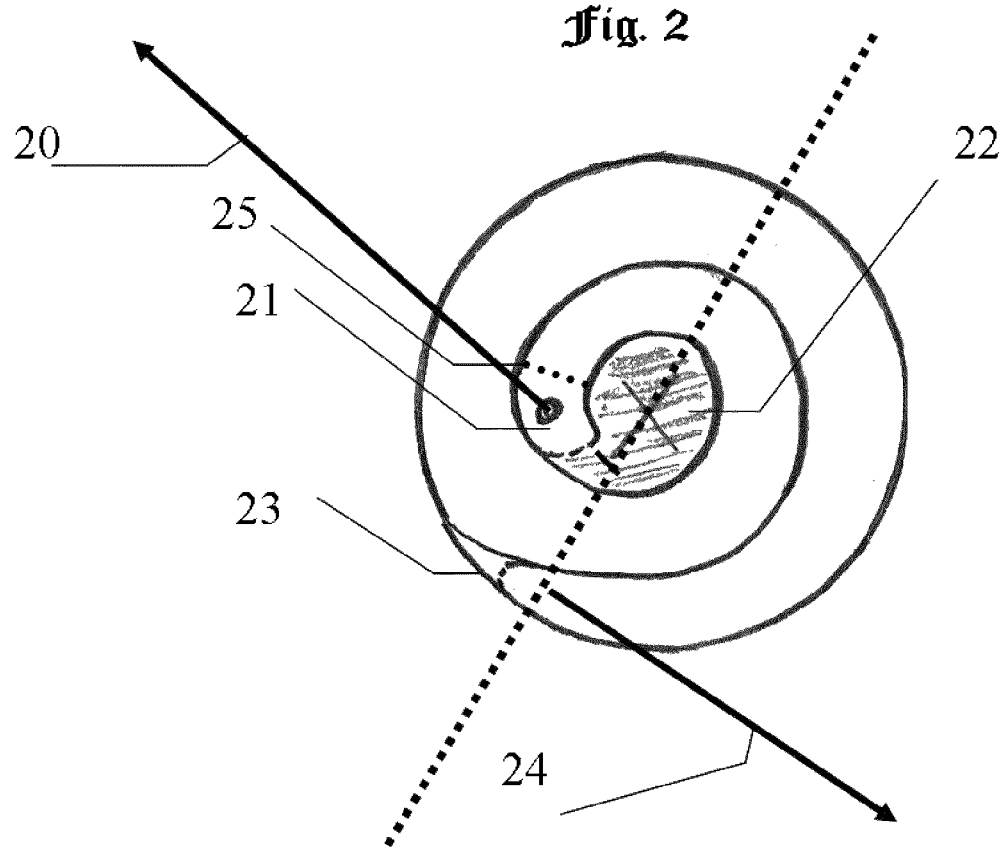
FIG. 2 shows the stamped or cut out helical spinner blade design, the eyelet 90 degree break line, and the direction of expanding the flat material into the standardized helical form factor.

The eyelet flange is bent to the specified angle and length and in-line with the center of the spiral. The helical spinner blade is initially bent below the eyelet hole on the collar bend line as depicted in FIG. 2.25, and this dimension is standardized based on the size of the diameter of the initial helical spinner blade cutout. FIGS. 2.22 and 2.23 show the cut off pieces discarded after the fabrication process. After the unit is punched out, the flat, cut out helical spinner blade is then pulled as in FIG. 20 at one end by the eyelet hole as in FIG. 2.21 and pulled in the opposite direction at the tail end as in FIG. 24 until complying with overall length specifications and creating the consistently fabricated spiral effect and form factor for the finished helical spinner blade. For the inline specifications, the bend at the eyelet bend point is done after achieving the desired finished shape, and then bent perpendicular to the centerline of the funnel shape.

Figure 3:
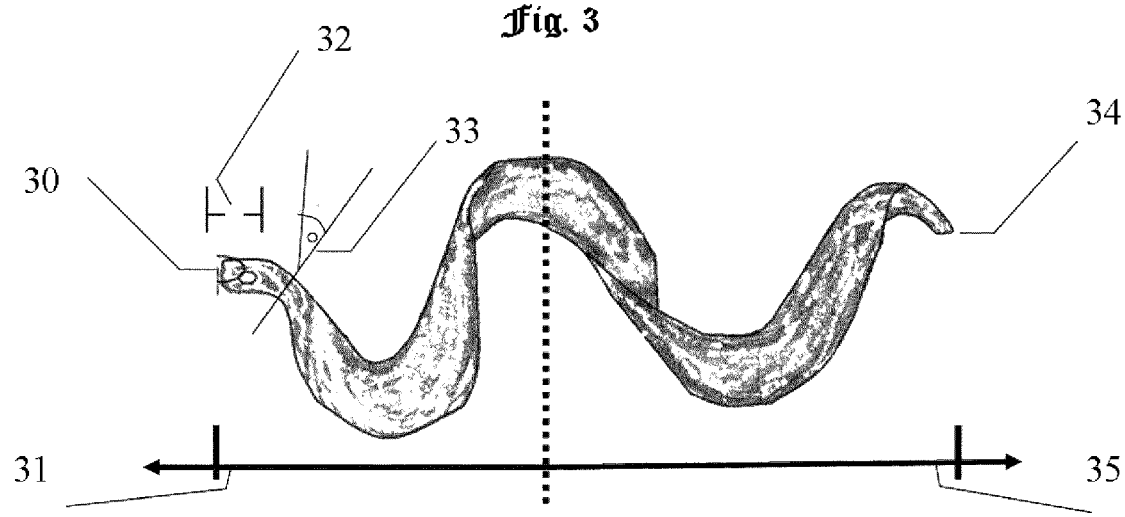
FIG. 3 shows the side view of the helical spinner blade in a free form application, with the collar bend angle, the eyelet hole and overall helical nature of the spinner blade.

The desired form of the helical spinner blade is depicted in FIG. 3 showing the finished eyelet hole as in FIG. 3.30 and the desired degree bend as in FIG. 3.33. The bend length in FIG. 3.32 is relative to the width of the helical spinner blades and length of the helical spinner blade as in FIG. 3.34. The bend degree typically ranges from 30 degrees to 175 degrees depending on the desired wobble effect of the helical spinner blade, which mimics a wounded fish, or the standard 90 degree bend for most applications. The tail of the helical spinner blade is either bent at an angle, sheared into a split tail, or rounded and sculpted to the specs of the specific type of helical spinner blade.

Figure 4:
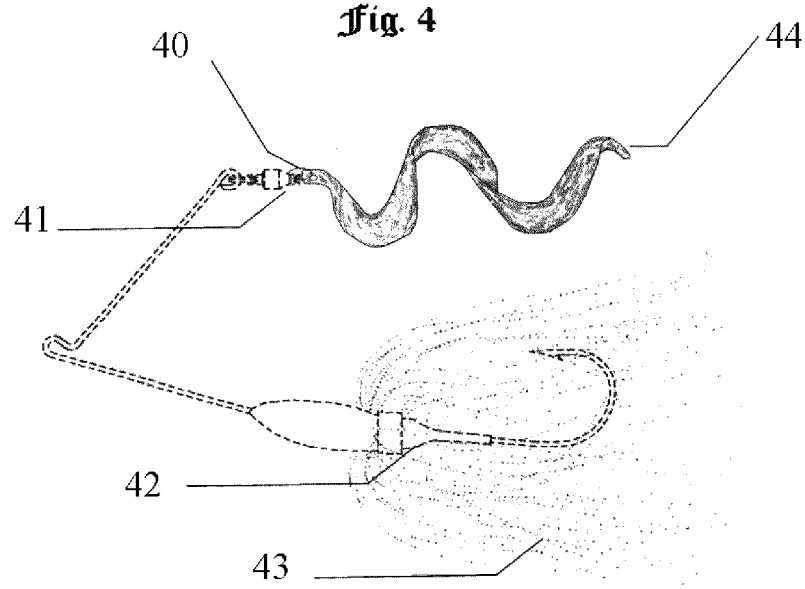
FIG. 4 shows a free form application on a traditional "L" shaped spinner bait. The helical spinner blade is mounted to the wire shaft frame with a ball bearing, swivel, and split rings.

The free form spinner bait is comprised of a wire shaft and a molded lead free body and a fabricated hook and obtained in varying sizes and shapes as shown in FIG. 4.42. The skirt material in FIG. 4.43 is standard industry material and hand tied to the molded body and designed to attractive color and material offerings. The new helical spinner blade FIG. 4.44 is attached to a split ring in FIG. 4.40, then to the ball bearing swivel in FIG. 4.41, then to another split ring affixed to the loop on the wire shaft. The spinner bait configuration can vary in size and form depending on the type of fish the angler is focusing on, and the new helical spinner blade design will scale accordingly.

Figure 5:
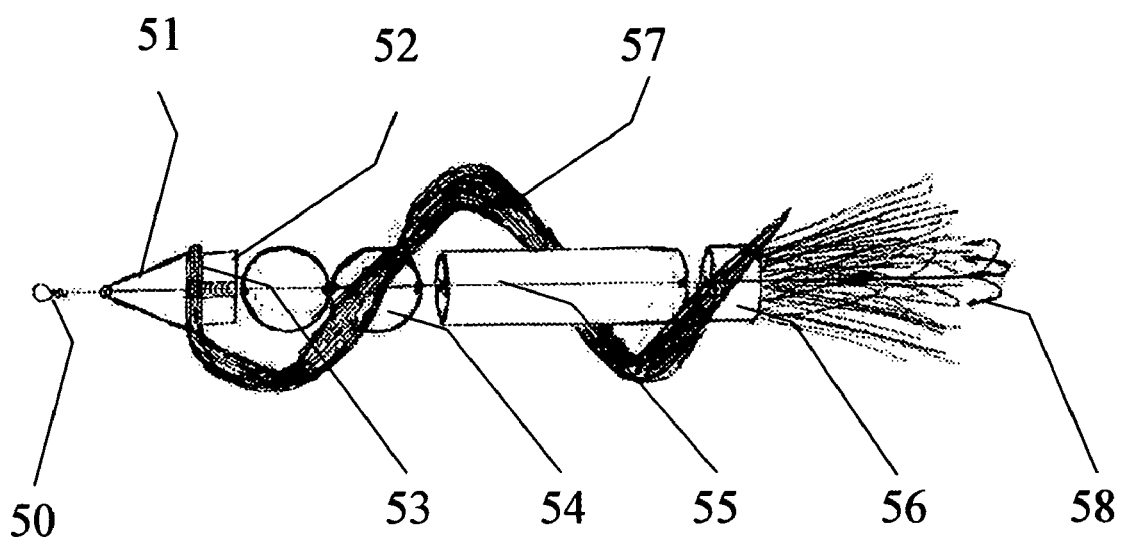
FIG. 5 shows a side view of the inline helical spinner blade application, where the bend is perpendicular to the inline helical spinner blade center line. The blase helical spinner blade assembly is comprised of a cast metal, center bored cap and collar assembly that screws together through the eyelet hole in the helical spinner blade to provide a stable spinning tube around the wire shaft.

The inline version of the helical spinner blade design shown in FIG. 5 has one distinct difference from the free form helical spinner blade, and that is, the angle of the bend below the helical spinner blade eyelet and perpendicular orientation of the bend to the helical spinner blade center line. The cast metal helical spinner blade cap and collar depicted in FIG. 5.51 and FIG. 5.52 are threaded with a male and female end respectively, cast to specifications based on the wire shaft and helical spinner blade size with a center bored hole running parallel from the center of the nose of the helical spinner blade cap through the threaded helical spinner blade cap shaft and collar, and screw together through the helical spinner blade eyelet hole shown in FIG. 5.53 and more clearly depicted in FIG. 6.60. The collar and cap assembly depicted in FIG. 6 forms a stable tube running perpendicular through the helical spinner blade eyelet hole area as in FIG. 6.60 ranging in diameter of 0.030 to 0.375 according to the width of the helical spinner blade in FIG. 1.14, respective diameter of the eyelet hole as shown in FIG. 1.10 in the helical spinner blade, and overall size and specific configuration and application of the inline spinner assembly. FIG. 5.54 depicts the round plastic of or metal beads that the helical spinner blade, cap, and collar assembly rotates against to reduce friction and provide a smooth, ball bearing effect. FIG. 5.55 is the body of spinner bait lure, which can be made from metal, plastic, painted material, holographic material, and thermoformed material in a number of sizes, colors and patterns. The skirt assembly shown in FIG. 5.56 is assembled out of multiple types of material, hand tied with thread or collared to a small 0.032"-0.375"×Z" tube and shrink formed with glue to adhere the feathers and other silicone based skirt materials to the tube. The hook FIG. 5.58 is first assembled to the wire shaft ranging from 0.020" to 0.375" in diameter using a loop tool. The skirt assembly tube is then slid on the wire from shaft and the body is then slid on the wire shaft next as in FIG. 5.55. The small beads in FIG. 5.53 are assembled to on the wire shaft next, and the helical spinner blade assembly is then slid on the wire shaft. FIG. 5.50 shows the final step in assembling the new inline spinner bait by closing the loop on the front end of the lure with a loop tool.

Figure 6:
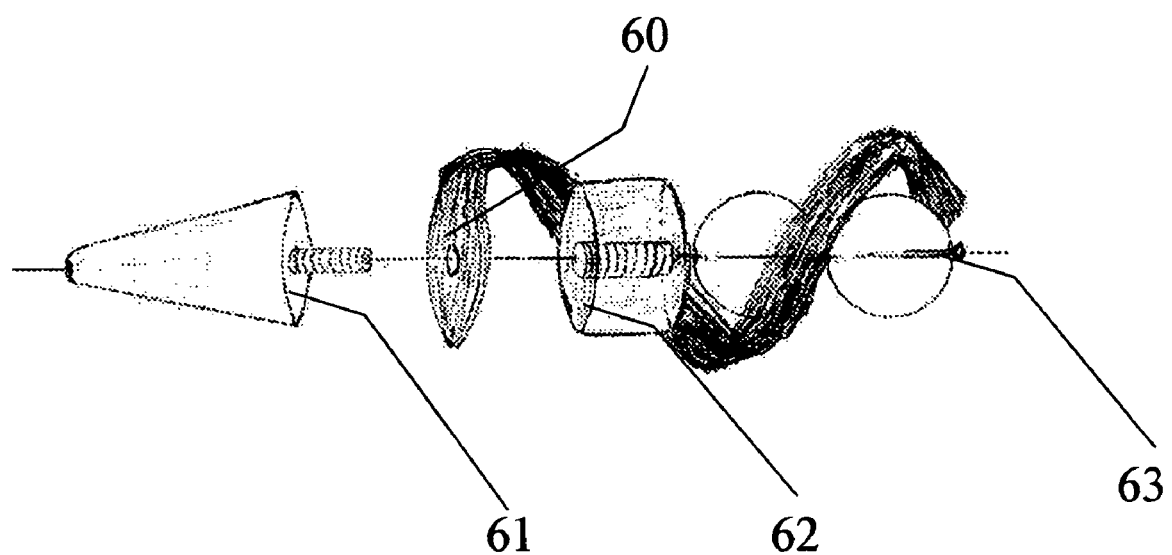
FIG. 6 shows a side view of the helical spinner blade cap and collar assembly, where the helical spinner blade is bent at a 90 degree orientation respective to the centerline axis of the expanded helical spinner blade. The assembly comprises of the center bored cap with a male threaded shaft, the helical spinner blade with eyelet hole, and the center bored female threaded collar.

The helical spinner blade cap and collar assembly is depicted in greater detail in FIG. 6 showing the helical spinner blade cap with the threaded male shaft in FIG. 6.61, the helical spinner blade collar with the female threaded and bored center hole in FIG. 6.62, the 90 degree bend and eyelet hole of the helical spinner blade that the helical spinner blade cap passes through and screws into the collar assembly as shown in FIG. 6.60. The helical spinner blade assembly and the bored beads are slid onto the wire shaft and thus rotates about the wire shaft elements, or the wire shaft is turned back 180 degrees at the end as in FIG. 6.63 which is clamped and concealed by the bore in the bead that is pressed over the turned back wire shaft, and the helical spinner blade cap and collar assembly rotates at the end of the wire shaft in which the helical spinner blade rotates and is cantilevered over and beyond the wire shaft. This configuration allows the helical spinner blade to rotate past the wire shaft that acts as an arm connected to a main body of a lure or wire shaft to attract fish by the constant circular motion of the helical spinner blade.

I claim:

1. An artificial inline helical spinner lure comprising:
   a wire shaft with a first closed loop connected to a hook at a first end of said wire shaft, and a second closed loop at a second opposite end of said wire shaft designed to connect to a fishing line;
   a helical spinner blade assembly comprising:
     a helical spinner blade extending along a center line, said helical spinner blade having one end with an eyelet hole, said helical spinner blade being bent adjacent to said one end thereof such that said one end of said helical spinner blade extends at an angle relative to the center line of said helical spinner blade;
     a spinner blade cap having a center bore, said spinner blade cap further having a male fastener portion extending therefrom which is threaded, said center bore of said spinner blade cap extending through said male fastener portion so as to be aligned therewith; and
     a blade collar having a center bore with a female fastener portion therein which is threaded;
     wherein said spinner blade cap male fastener portion extends through said helical spinner blade eyelet hole and threadably engages said female fastener portion inside said blade collar center bore so as to secure said one end of said helical spinner blade between said spinner blade cap and said blade collar, and said wire shaft extends through said center bore of said spinner blade cap, said eyelet hole and said center bore of said blade collar; and
   a plurality of metal or plastic beads having bores, said plurality of beads being slid onto said wire shaft such that said wire shaft extends through said bores of said beads to allow the helical blade assembly to rotate easily about the shaft;
   a metal or plastic body having a center bore which receives said wire shaft therethrough;
   a streamer assembly of natural or plastic material attached onto said wire shaft; and
   wherein said helical blade assembly rotates freely about said body and streamer assembly.

2. A lure as claimed in claim 1 wherein said first closed loop at said first end of said wire shaft forms a stop which is abutted by at least one of the plurality of beads to allow said helical spinner blade assembly to rotate about said wire shaft with said helical spinner blade cantilevered from said wire shaft and rotating freely about a longitudinal axis of said wire shaft.

3. A lure as claimed in claim 1 wherein said natural material of said streamer assembly is chosen from natural feathers, natural hairs, and natural furs to thereby allow the lure to assume a wide range of colors and individual characteristics so as to be natural and fish attracting.

4. A lure as claimed in claim 1 wherein said angle at which said one end of said helical spinner blade extends relative to the center line of said helical spinner blade is 90 degrees.

* * * * *